US006851401B2

(12) United States Patent
Nyström

(10) Patent No.: US 6,851,401 B2
(45) Date of Patent: Feb. 8, 2005

(54) DEVICE FOR CONVERTING A LINEAR MOVEMENT INTO A ROTARY MOVEMENT

(76) Inventor: Rune Nyström, S-784 37, Borlänge (SE)

( * ) Notice: Subject to any disclaimer, the term of this patent is extended or adjusted under 35 U.S.C. 154(b) by 0 days.

(21) Appl. No.: 10/180,850

(22) Filed: Jun. 26, 2002

(65) Prior Publication Data

US 2002/0162527 A1 Nov. 7, 2002

Related U.S. Application Data

(63) Continuation of application No. PCT/SE01/00003, filed on Jan. 2, 2001.

(30) Foreign Application Priority Data

Dec. 30, 1999 (SE) ............................... 9904843

(51) Int. Cl.[7] ............................... F02B 75/32
(52) U.S. Cl. .................................... 123/53.1
(58) Field of Search ........................... 123/48 B, 197.4, 123/197.1, 48 R, 78 R, 53.1, 197.3, 51 BB, 53.5

(56) References Cited

U.S. PATENT DOCUMENTS

| 1,956,804 A | * | 5/1934 | Meyer ..................... 123/197.4 |
| 5,816,201 A | * | 10/1998 | Garvin .................... 123/197.3 |
| 6,058,901 A | * | 5/2000 | Lee ........................ 123/197.1 |
| 6,227,161 B1 | * | 5/2001 | Urushiyama ............. 123/197.4 |
| 6,745,746 B1 | * | 6/2004 | Ishii ........................ 123/316 |

FOREIGN PATENT DOCUMENTS

| DE | 3131060 A1 | 8/1981 | |
| DE | 19733538 A1 | 8/1997 | |
| EP | 0 284 430 | 3/1988 | |
| GB | 2219345 A | * 12/1989 | ........... F02B/75/26 |
| WO | Wo 95/30826 | 11/1995 | |

* cited by examiner

Primary Examiner—Tony M. Argenbright
Assistant Examiner—Hyder Ali
(74) Attorney, Agent, or Firm—Schmeiser, Olsen & Watts, LLP

(57) ABSTRACT

A device for converting a rectilinear movement into a rotary movement, comprising at least one piston-cylinder mechanism having a cylinder and a piston moveable arranged in the cylinder for rectilinear movement, a crankshaft for rotary movement, and a connecting rod connecting the piston and the crankshaft, the centre of rotation of the crankshaft being arranged displaced at a distance from the line along which the piston is moveable and that the crankshaft has a direction of rotation so that the part of the crankshaft which in relation to the movement line of the piston is located on the other side of the centre of rotation of the crank shaft, looked at the device in the longitudinal direction of the crankshaft has a movement component which is parallel with the movement line of the piston and directed away from the cylinder.

26 Claims, 4 Drawing Sheets

| Rotation of crankshaft γ | Conventional device according to FIG. 1.<br><br>Connecting rod, L=145 mm<br>Displacment distance, F=0 mm<br>Crankshaft radius, R=40 mm<br>A [mm] | A device according to the invention as shown in FIG. 3.<br><br>Connecting rod, L=115 mm<br>Displacment distance, F=30 mm<br>Crankshaft radius, R=40 mm<br>A [mm] |
|---|---|---|
| 0 | 0 | 0 |
| 5 | 0.19 | 0.21 |
| 10 | 0.77 | 0.84 |
| 15 | 1.73 | 1.90 |
| 20 | 3.06 | 3.37 |
| 25 | 4.74 | 5.25 |
| 30 | 6.74 | 7.52 |
| 35 | 9.06 | 10.16 |
| 40 | 11.66 | 13.13 |
| 45 | 14.50 | 16.41 |
| 50 | 17.56 | 19.96 |
| 55 | 20.81 | 23.74 |
| 60 | 24.20 | 27.71 |
| 65 | 27.70 | 31.80 |
| 70 | 31.28 | 35.98 |
| 75 | 34.89 | 40.19 |
| 80 | 38.51 | 44.38 |
| 85 | 42.10 | 48.50 |
| 90 | 45.63 | 52.51 |
| 95 | 49.07 | 56.36 |
| 100 | 52.40 | 60.01 |
| 105 | 55.60 | 63.44 |
| 110 | 58.64 | 66.61 |
| 115 | 61.51 | 69.52 |
| 120 | 64.20 | 72.14 |
| 125 | 66.69 | 74.48 |
| 130 | 68.99 | 76.52 |
| 135 | 71.07 | 78.28 |
| 140 | 72.94 | 79.76 |
| 145 | 74.59 | 80.97 |
| 150 | 76.03 | 81.92 |

DEVICE FOR CONVERTING A LINEAR MOVEMENT INTO A ROTARY MOVEMENT

This is a continuation of Application No. PCT/SE01/00003, filed Jan. 2, 2001.

FIELD OF THE INVENTION AND PRIOR ART

The present invention relates to a device for converting a rectilinear movement into a rotary movement, comprising at least one piston-cylinder mechanism having a cylinder and a piston movably arranged in the cylinder for a rectilinear movement, a crankshaft for rotary movement, and a connecting rod connecting the piston and the crankshaft. The invention also relates to the use of such a device in a piston engine having internal combustion.

In the following the invention will be described by means of different examples of embodiments of the device, which may be applied in the engines, such as different types of single and multiple cylinder combustion engines, for converting a rectilinear movement into a rotary movement. In this connection a number of frequently used expressions within the technical field of engines are used. The current expressions are among others connecting rod, crankshaft, piston stroke length, upper and lower dead centre etc. Although these standards are established for engines and well defined, and would not create any uncertainty regarding what is intended, it is stressed that a generous attitude should be used when the definitions of the claims are interpreted, and that the different components, such as piston, cylinder, connecting rod and crankshaft, certainly may be designed in many ways while maintaining the idea of the invention.

In combustion engines, i.e. such engines which convert heat energy into mechanical work by internal combustion of a fuel-air mixture, and in the first place combustion engines using one or more pistons, there is a desire to convert the energy released in the combustion to useful work on a crankshaft in the most efficient way. The working principle is simply described that a piston is brought to a rectilinear movement in a cylinder through combustion of a compressed fuel-air mixture in the gas-sealed cylinder and that a connecting rod, pivotally connected with the piston as well as with the crankshaft, transfers the rectilinear movement of the piston into a rotary movement of the crank-shaft.

The working procedure of a conventional piston engine varies depending on the type of engine and the number of cylinders. For example there are four-stroke engines and two-stroke engines, and also there are different combustion systems, for example the Otto cycle and the Diesel engine. However, common to all piston engines is that during the expansion stroke the heat energy originating from the fuel is converted into mechanical work. In an Otto engine the course is such that the fuel-air mixture is compressed in the cylinder by moving the piston, while the space for the mixture is decreased, to a position called upper dead centre and just before this position the fuel-air mixture is ignited by a spark, and the expansion stroke arising from the expansion of the combustion gas means that the piston is moved from the upper dead centre toward the lower death centre while the energy of the combustion gases may be used to rotate the crankshaft. Although the invention in the first place is described by reference to Otto cycle engines it would be successfully applied also in Diesel engines.

A disadvantage of today's combustion engines is the difficulty to provide a favourable transmission of force from the piston to the crankshaft during the phase of the expansion stroke when the combustion gases give rise to the greatest forces on the piston, i.e. shortly after the moment of ignition. The invention is based on the knowledge that the combustion is such that the expanding combustion gas effects the piston to the greatest extent, i.e. by a proportionately great force, in the beginning of the expansion stroke, shortly after the ignition, which ignition takes place approximately when the piston is in the upper dead centre or better somewhat earlier and maximal compression of the fuel-air mixture is present, and that the combustion gas effects the piston only to less extent, i.e. by a smaller force, during the later part of the expansion stroke. If the greatest possible output is desired thus, it is important to efficiently use the part of the expansion stroke when the piston is effected by the greatest forces from the combustion gases, in a way so that during this part of the expansion stroke a favourable transmission of force to the crankshaft is present.

THE OBJECT OF THE INVENTION

The object of the invention is to provide a device for converting a rectilinear movement into a rotary movement, especially in piston combustion engines, in which device favourable transmission of force from the piston moving rectilinear, via the connecting rod, to the rotating crankshaft, is obtained during the phase of the expansion stroke of the piston when a force, expanding combustion gases for instance, effects the piston to the greatest extent. In this connection the invention aims to assign construction solutions of principle for providing the favourable transmission of force during the current phase.

The object above is obtained by designing the device according to the invention in such a way that the centre of rotation of the crankshaft is arranged displaced at a distance from the line along which the piston is movable and that the crankshaft has a direction of rotation so that the part of the crankshaft which in relation to the movement line of the piston is located on the other side of the centre of rotation of the crankshaft, looked at the device in the longitudinal direction of the crankshaft, has a movement component which is parallel with the movement line of the piston and directed away from the cylinder.

Herethrough the crankshaft will be tilted in relation to the line along which the piston is movable already when the piston is located at the upper dead centre. In the upper dead centre the connection and rotation point of the connecting rod at the piston, the connection and rotation point of the connecting rod at the crankshaft and the centre of rotation of the crankshaft all are located along one and the same line. However, as soon as the piston has moved a bit from the upper dead centre the connecting rod will be tilted in relation to its position at the upper dead centre, through the fact that the connection point of the connecting rod at the crankshaft rotates with the crankshaft and thus at the beginning is moved in a direction away from the movement line of the piston. For such a given tilt of the connecting rod in relation to the position at the upper dead centre, at the beginning it will be required a smaller movement of the piston from the upper dead centre for obtaining this tilt in the device according to the invention than what is the case for a corresponding conventional device without any displacement of the centre of rotation of the crankshaft. In accordance with what is mentioned above about the effect on the piston by the combustion gas during the expansion stroke the shorter piston movement required means that for such a given tilt of the connecting rod in relation to its position in the upper dead centre, in the device according to the invention a higher pressure in the cylinder is present, and accordingly a greater force acts on the piston, than in a conventional device. When the piston is moved, a given angle deflection of the crankshaft will correspond to a longer movement of the piston from the upper dead centre in the device according to the invention. All together this means that immediately after the ignition a tilt which results in that the force from the piston may start to be transferred in a favourable way is obtained for a proportionately small movement of the piston and that during the expansion stroke a gear reduction is obtained by the fact that a given movement of the piston results in a smaller angle deflection on the crankshaft, whereby a more favourable transmission of force is obtained during the expansion stroke in its entirety.

However, it should be pointed out that the arguments above are not stated with the ambition to completely describe the underlying relationships or mechanisms, which give rise to the advantages of the device according to the invention. Instead the description above may be seen as an outline of a theory which possibly may explain why the device according to the invention has better performance than such corresponding conventional devices. However, the advantages have unambiguously been proved by carrying out experiment in which the invention has been applied in an Otto engine having four cylinders. The concrete advantages of the invention applied in a combustion engine is that the engine may provide a higher torque on the crankshaft, which in its turn means that the engine may supply a certain output at a lower rotation speed, which in its turn would lead to lower fuel consumption. Furthermore, the engine according to the invention is less disposed to knock, i.e. there is a smaller risk that non-combusted fuel-air mixture will self-ignite in an undesired way. It has been established that by the engine according to the invention it is possible to compress the fuel-air mixture up to higher pressures than what is possible in conventional Otto engines, in some cases up to a pressure exceeding 15 bar, without any knocking (self-ignition) appearing. Furthermore, measures of the exhaust of the engine by a lambda probe indicate that a more complete combustion of the fuel is obtained. It should also be mentioned that the engine according to the invention needs less cooling than normally and this indicates that a greater part of the energy of the fuel is transferred to useful work on the crankshaft and a smaller part is transferred to heat.

For obtaining this it has been found that it is important that the displacement of the centre of rotation of the crankshaft and the direction of rotation of the crankshaft are related to each other in accordance with the definition mentioned above. Furthermore, of course the size of the displacement has to be adapted to other practical conditions of the engine present, which means that even if a maximum displacement distance is desired, the displacement distance must often be less than 0.9 multiplied by the length of the piston stroke and suitably in the interval 0.01 to 0.8 multiplied by the length of the piston stroke and preferably a displacement distance in the interval 0.2 multiplied by the length of the piston stroke to 0.6 multiplied by the length of the piston stroke is chosen.

According to a preferred embodiment of the invention the distance between the connection point of the connecting rod at the piston and the connection point of the connecting rod at the crankshaft is greater than zero and less than or equal to 1.5 multiplied by the length of the piston stroke.

By a shorter connecting rod, i.e. a shorter distance between the connection point of the connecting rod at the piston and its connection point at the crankshaft, the properties mentioned above are obtained to an even greater extent. Thus, a proportionately short connecting rod may contribute further to the performance of the device. In conventional engines the relation between the length of the connecting rod and the length of the piston strokes greater than 1.5:1 and often in the magnitude of 2:1. However, in the device according to the invention, as mentioned above, in some cases proportions <1.5 may be used. Certainly, there are geometrical and mechanical limitations present, which obstruct or prevent that a very short connecting rod is used. This means that even if the shortest connecting rod possible is desired, when applying this embodiment of the invention the distance between the connection point of the connecting rod at the piston and the connection point of the connecting rod at the crankshaft is suitably in the interval 1.1 to 1.5 multiplied by the length of the piston stroke, often in the interval 1.2 to 1.5 multiplied by the length of the piston stroke, and preferably in the interval 1.3 to 1.5 multiplied by the length of the piston stroke. Through different combinations of displacement of the centre of rotation of the crankshaft and the length of the connecting rod the performances of the engine according to the invention may be varied and optimized while considering other conditions and limitations of the engine.

Advantageous variants of the device according to the invention are dealt with in the dependent claims.

The invention also relates to the use of the device according to the invention in a piston engine having internal combustion.

BRIEF DESCRIPTION OF THE DRAWINGS

With reference to appended drawings below follows a closer description of embodiments of the invention cited as examples.

In the drawings:

FIG. 4 is a table of piston movement in relation to rotation of the crankshaft.

DETAILED DESCRIPTION OF PREFERRED EMBODIMENTS OF THE INVENTION

Figure 1:
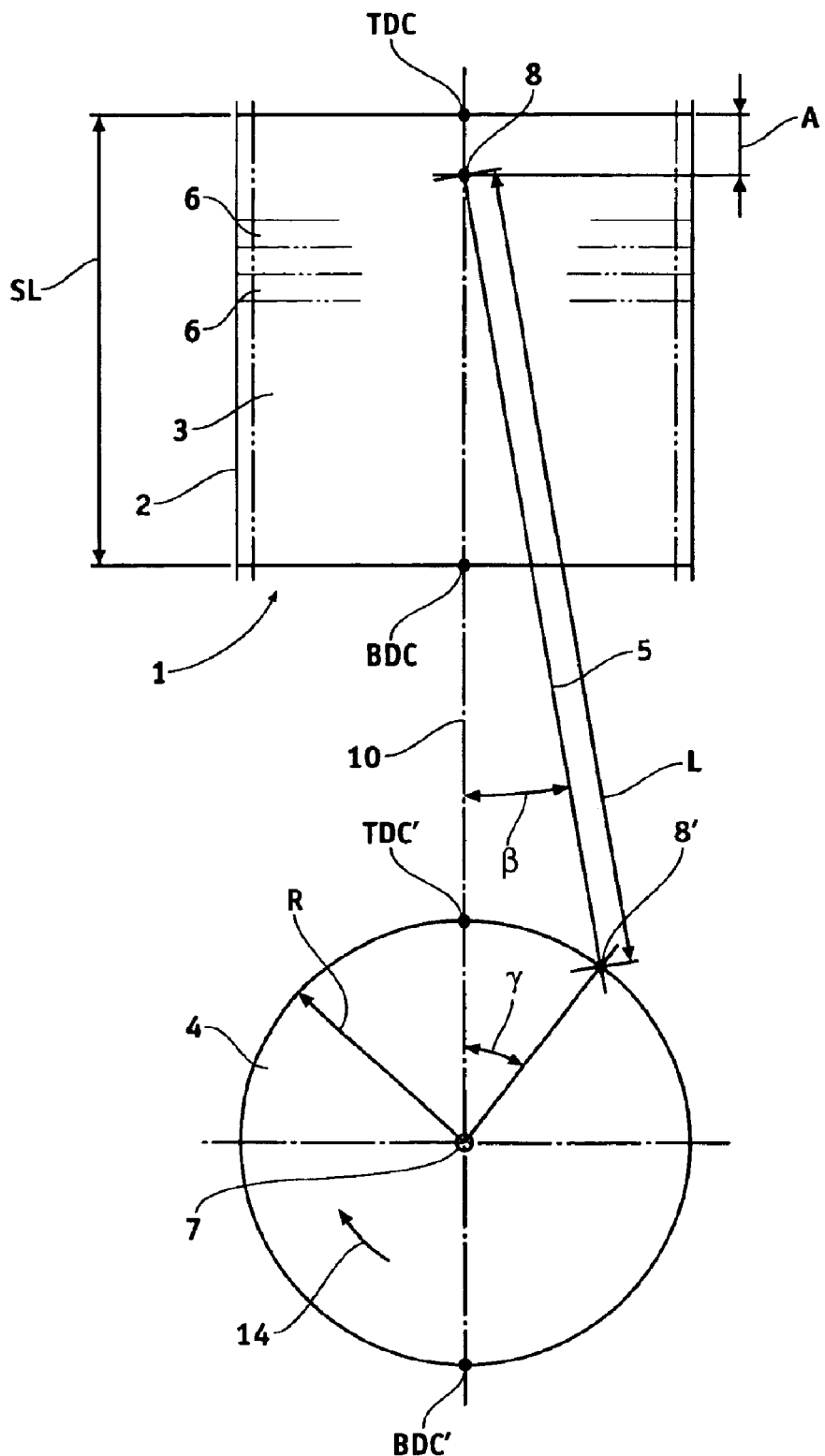
FIG. 1 is a schematical view illustrating how a rectilinear movement of a piston is transferred into a rotation movement of a crankshaft via a connecting rod.

In FIG. 1 a piston-cylinder mechanism 1 having a cylinder 2 and a piston 3 movably arranged in the cylinder 2 for rectilinear movement, a crankshaft 4 for rotary movement and a connecting rod 5 connecting the piston 3 and the crankshaft 4 are schematically illustrated. The piston 3 which is suitably gas-sealed by piston rings 6 and runs in the cylinder 2 is arranged for repeated movement backwards and forwards between two extreme positions called upper or top dead centre TDC and lower or bottom dead centre BDC. It is to be understood that the term "upper dead centre" is the same as top dead centre (TDC) and "lower dead centre" is the same as "bottom dead centre" (BDC) for purposes of this disclosure. The distance between the upper dead centre TDC and the lower dead centre BDC is thus the length of the piston stroke SL. The connecting rod 5, in one end 8 thereof, is pivotally connected with the piston 3 and, in the other end 8 thereof, pivotally connected with the crankshaft 4. The connecting rod 5 is connected with a socalled crank web of the crankshaft 4 at a certain distance R from the centre 7 of rotation of the crankshaft in a conventional way.

In FIG. 1 the connecting rod 5 is schematically illustrated for a piston position located between the upper and the lower dead centre. The different positions of the connection point between the piston 3 and the connecting rod 5, for the piston position illustrated and the positions corresponding to upper and lower dead centre, are denoted TDC 8 and UV, and the corresponding different positions of the connection point between the connecting rod 5 and the crankshaft 4 are denoted TDC', 8' and BDC', respectively, for the different piston positions.

The embodiment illustrated in FIG. 1 is a conventional device in which the centre 7 of rotation of the crankshaft 4 is located in line with the movement direction of the piston, i.e. the prolongation of the line 10 along which the piston 3 is movable extends through the centre 7 of rotation of the crankshaft 4. Furthermore, the relation between the distance L, i.e. the distance between the connection point 8 of the connecting rod 5 at the piston and the connection point 8' of the connecting rod 5 at the crankshaft 4, herein also termed connecting rod length, and the length of the piston stroke SL is approximately 1.81:1 (connecting rod length=145 mm and piston stroke length=80 mm).

At the upper dead centre TDC or just before the piston 3 is in the upper dead centre TDC, the compressed fuel-air mixture in the cylinder 2 is ignited and the piston 3 is moved from the upper dead centre TDC towards the lower dead centre BDC as a consequence of the pressure which is exerted on the piston 3 from the combustion gas during its expansion. The movement of the piston 3 from the upper dead centre TDC to the lower dead centre BDC is accordingly called the expansion stroke. The pressure or the force from the gas varies during the expansion stroke and is the greatest during the first part of the expansion stroke, i.e. after ignition the force increases rapidly to a maximum value and then the force decreases as the piston 3 is moved towards the lower dead centre BDC. This means that between the upper dead centre TDC and a subsequent piston position when the piston has been moved a smaller part of the piston stroke length SL most of the energy of the fuel which may be used for a rotation of the crankshaft 4 is released. This torque which is provided on the crankshaft 4 is equal to the force which is transferred to the crankshaft 4 by means of the connecting rod 5 multiplied by the effective lever arm of the connecting rod 5 in relation to the centre 7 of rotation of the crankshaft 4. The lever arm will vary during the expansion stroke between the value 0, which is present at the upper dead centre and at the lower dead centre, and the maximum value R which is present in a point between these dead centre positions, where R as mentioned before is the distance between the centre 7 of rotation of the crankshaft 4 and the connection point 8' of the connecting rod 5 at the crankshaft 4. The direction of rotation of the crankshaft is denoted 14. Furthermore, the connecting rod is illustrated for a position when it constitutes the angle β=10° in relation to its position in the upper dead centre, which corresponds to a movement A of the piston of approximately 11 mm from the upper dead centre.

Throughout the description similar reference numbers indicate similar or corresponding components, for which reason the common basic designs for the different embodiments will not be described in detail in the following examples of embodiments of the device according to the invention.

Figure 2:
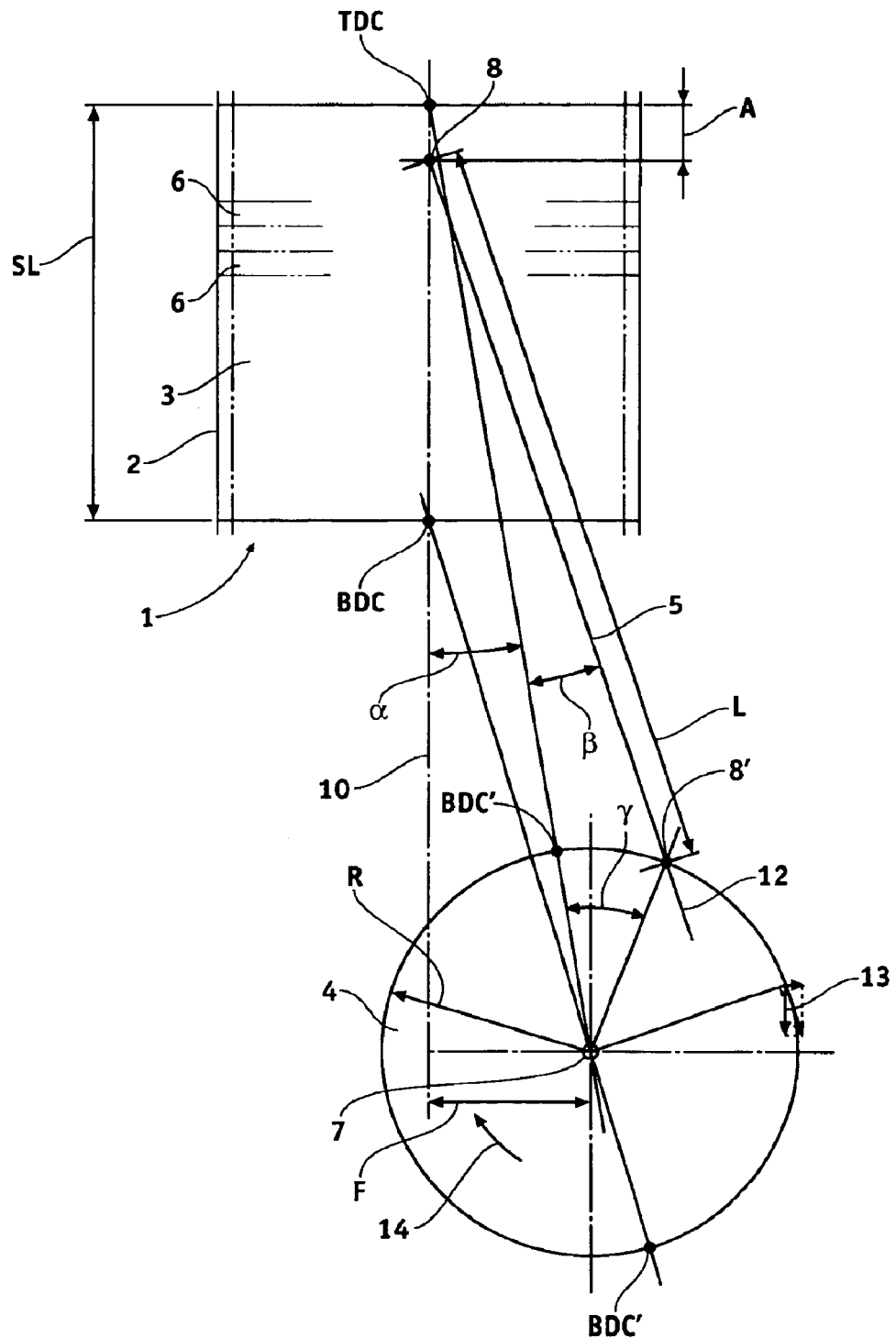
FIG. 2 is a schematical view in accordance with FIG. 1, the centre rotation of the crankshaft being displaced in relation to the movement line of the piston.
Figure 3:
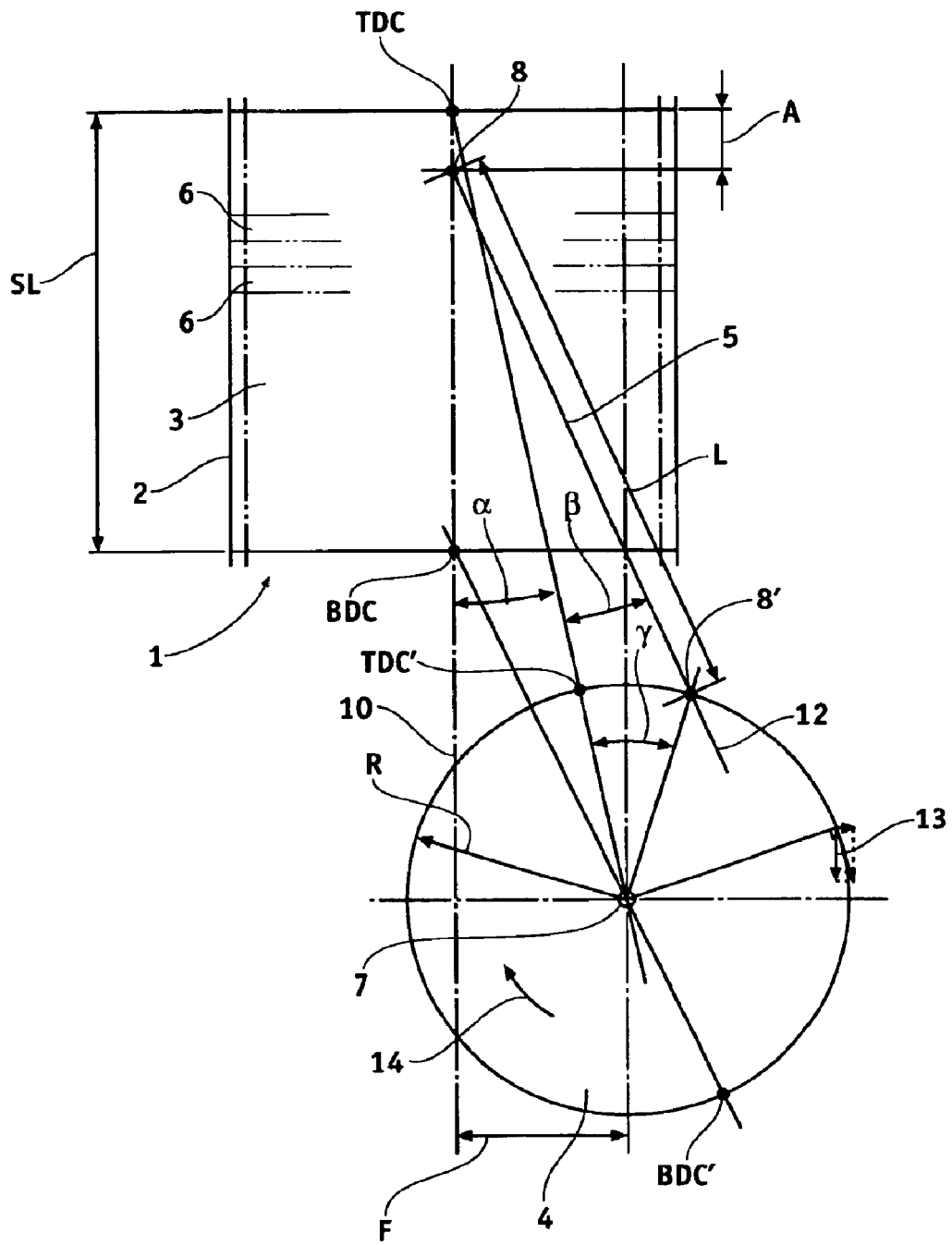
FIG. 3 is a schematical view in accordance with FIG. 2, the relation between the length of the connecting rod and the stroke length being less than 1.5.

In FIG. 2 a device 1 according to the invention is illustrated in which the centre 7 of rotation of the crankshaft 4 is arranged displaced in a distance F from the line 10 along which the piston 3 is movable and in which the crankshaft 4 has a direction 14 of rotation so that the part of the crankshaft which in relation to the movement line 10 of the piston is located on the other side of the centre 7 of rotation of the crankshaft 4, looked at the device in the longitudinal direction of the crankshaft 4, has a movement component 13 which is parallel with the movement line 10 and directed away from the cylinder 2. The displacement distance F is suitably in the interval greater than zero but less than 0.9 multiplied by the length of the piston stroke, often in the interval 0.01 to 0.8 multiplied by the length of the piston stroke an preferably in the interval 0.2 to 0.6 multiplied by the length of the piston stroke. Thus, it is stressed that the embodiment according to FIG. 2 is to be regarded as an example only. In this embodiment the displacement distance F is approximately equal to 0.38 multiplied by the length of the piston stroke SL. It is stressed that it is fundamental for the invention that the displacement F of the centre 7 of rotation of the crankshaft 4 is related to the direction 14 of rotation of the crankshaft as defined above. This means that the direction 14 of rotation of the crankshaft 4 is clockwise when looked at the device as it is illustrated in FIGS. 2 and 3, i.e. looked at in the longitudinal direction of the crankshaft, having the cylinder 2 located above the crankshaft 4 and the displacement of the centre of rotation of the crankshaft to the right of the line 10 along which the piston 3 is movable.

The device according to the invention having the displacement distance F or in other words having a tilt of the cylinder 2 by an angle α, has the performance that a certain tilt of the connecting rod 5 in relation to the position of the connecting rod in the upper dead centre, this tilt being defined as the angle β between on the one hand a line 11 extending through the connection point TDC of the connecting rod 5 at the piston 3 and the connection point TDC' of the connecting rod 5 at the crankshaft 4 (and the centre 7 of rotation of the crank shaft 4), when the piston 3 is in the upper dead centre, and on the other hand a line 12 extending through the two connection points 8, 8' of the connecting rod, when the position of the piston 3 is different from the upper dead centre, corresponds to a movement A of the piston 3 which is smaller than what is the case in a device according to the state of the art as illustrated in FIG. 1. In FIG. 2 β=10° and A is approximately 10 mm. When the piston 3 is moved a gear reduction will be obtained by the fact that a greater movement of the piston from the upper dead centre corresponds to a smaller angle deflection on the crankshaft 4. During this part of the expansion phase a very favourable transmission of force is obtained which results in a proportionately high torque of the engine. With reference to FIG. 3 the relation between the movement A and the angle deflection γ on the crankshaft 4 will be described more in detail. Note that in the conventional device according to FIG. 1 the line along which the piston is movable, i.e. the longitudinal centre line of the cylinder, coincides with the line which extends between the connection points of the connecting rod when the piston is located in the upper dead centre or in other words; in this device the angle α is equal to zero.

As indicated above it is also possible to define the displacement as a tilt of the cylinder by the angle α in relation to the centre 7 of rotation of the crankshaft 4 while considering the direction 14 of rotation of the crankshaft 4. In FIGS. 2 and 3 the angle α is defined as the acute angle which is obtained between the line 10 along which the piston 3 is movable and the line 11 which extends from the connection point TDC of the connecting rod 5 at the piston 3 (and through the connection point TDC' of the connecting rod 5 at the crankshaft) to the centre 7 of rotation of the crankshaft 4 when the piston 3 is in the upper dead centre TDC.

As already mentioned the invention may be applied in various degree depending on the other circumstances present regarding the engine in which the invention is applied. In FIG. 2 the displacement distance F is approximately 0.38 multiplied by the length of the piston stroke (a is approximately equal to 9.5°) and the relation between the length L of the connecting rod and the length of the piston stroke SL is 1.77:1 (connecting rod length=145 mm-and piston stroke length=82 mm). One alteration which occurs as a consequence of the displacement F is that the position of the connection point of the connecting rod at the crankshaft, in the lower dead centre BDC', is displaced in relation to the position of the connection point of the connecting rod at the crankshaft, in the upper dead centre TDC', so that the rotation of the crankshaft 4 during full expansion stroke will be less than 180°.

In the embodiment in FIG. 3 the two aspects of the invention have been combined, i.e. the device is designed with a displacement F of the centre 7 of rotation of the crankshaft 4 and a connecting rod 5 which in relation to the length of the piston stroke SL is proportionately short. The displacement distance F is of the magnitude 0.36 multiplied by the length of the piston stroke SL (α is approximately equal to 11°) and the distance L between the connection point 8 of the connecting rod at the piston 3 and the connection point 8' of the connecting rod 5 at the crankshaft 4 is of the magnitude 1.38 multiplied by the length of the piston stroke (connecting rod length=115 mm and piston stroke length=83.3 mm). Furthermore, β is equal to 10° and A approximately 8 mm. This embodiment gives to an even greater extent the advantages described above including good transmission of force from the piston 3 to the crankshaft 4 during the expansion stroke. In FIG. 4 a table is shown, in which the current piston movement A from the upper dead centre TDC is shown as a function of the angle deflection γ, in relation to the upper dead centre, of the crankshaft 4. In the table a conventional device according to FIG. 1 is compared to a device according to the invention shown in FIG. 3. As appears the percentage increase calculated of A in the device according to the invention is greatest for proportionately small angles γ on the crankshaft 4 and smaller for proportionately large angles γ on the crankshaft 4.

However, it is stressed that also this embodiment according to FIG. 3 should be considered as an example only and that the displacement distance F as well as the distance L between the connection points of the connecting rod 5 may be varied and combined in many different ways. Furthermore, it is stressed that although the combination of the two aspects of the invention often results in a high performance these may be applied separately and thus the displacement F according to the invention may be applied together with connecting rods having a conventional length.

In cases when also the other aspect of the invention is applied the distance L between the connection point 8 of the connecting rod 5 at the piston 3 and the connection point 8' of the connecting rod at the crankshaft 4 is suitably greater than 1.1 multiplied by the length of the piston stroke and less than or equal to 1.5 multiplied by the length of the piston stroke SL, often in the interval 1.2 to 1.5 multiplied by the length of the piston stroke SL and preferably in the interval 1.3 to 1.5 multiplied by the length of the piston stroke.

The devices illustrated in FIGS. 1, 2 and 3 are all shown for a piston-connecting rod position which means that the connecting rod 5 forms the angle β=10° in relation to the position of the connecting rod in the upper dead centre. This position is, however, only an example to illustrate how the piston movement A from the upper dead centre varies just in the initial stage of the expansion stroke in the various embodiments for one and the same angle β.

It is obvious that the embodiments described above should be regarded as examples only and that the critical values of the device, such as the displacement distance, and the distance between the connection point of the connecting rod at the piston and the connecting point of the connecting rod at the crankshaft, may be varied and combined in many different ways within the scope of the idea of the invention, and that the components of the device may be designed in many different ways and with many different dimensions within the scope of the idea of the invention.

What is claimed is:

1. A device for converting a rectilinear movement into a rotary movement, said device comprising a crankshaft and one or more piston-cylinder mechanisms, each piston cylinder mechanism having a cylinder, a piston and a connecting rod connecting the piston to the crankshaft such that said piston is moveably arranged in the cylinder for rectilinear movement along an axis of movement to cause said crankshaft to effect said rotary movement, wherein the crankshaft has a center of rotation which is arranged displaced at a displacement distance of greater than or equal to 0.01 multiplied by the length of the piston stroke from the axis of movement of the or each piston and that the crankshaft has a direction of rotation that is clockwise when looking at the device in the longitudinal direction of the crankshaft and with the device oriented so that the or each cylinder is located above the crankshaft and displacement of the center of rotation of the crankshaft is to the right of the axis of movement of the or each piston, wherein improved torque is provided in an early portion of the cycle after top dead center for higher performance.

2. A device according to claim 1, wherein the displacement distance is greater than three fourths of an inch from the axis of movement of the or each piston.

3. A device according to claim 1, wherein the displacement distance is >0.05 multiplied by the length of the piston stroke.

4. A device according to claim 1, wherein the displacement distance is >0.1 multiplied by the length of the piston stroke.

5. A device according to claim 1, wherein the displacement distance is >0.2 multiplied by the length of the piston stroke.

6. A device according to claim 1, wherein the displacement distance is >0.4 multiplied by the length of the piston stroke.

7. A device according to claim 1, wherein the displacement distance is >0.6 multiplied by the length of the piston stroke.

8. A device according to claim 1, wherein the displacement distance is in the interval 0.01 multiplied by the length of the piston stroke to 0.05 multiplied by the length of the piston stroke.

9. A device according to claim 1, wherein the displacement distance is in the interval 0.01 multiplied by the length of the piston stroke to 0.1 multiplied by the length of the piston stroke.

10. A device according to claim 1, wherein the displacement distance is in the interval 0.1 multiplied by the length of the piston stroke to 0.2 multiplied by the length of the piston stroke.

11. A device according to claim 1, wherein the displacement distance is in the interval 0.2 multiplied by the length of the piston stroke to 0.4 multiplied by the length of the piston stroke.

12. A device according to claim 1, wherein the displacement distance is in the interval 0.4 multiplied by the length of the piston stroke to 0.6 multiplied by the length of the piston stroke.

13. A device according to claim 1, wherein the displacement distance is less than 0.9 multiplied by the length of the piston stroke.

14. A use of a device according to claim 1 in a piston engine having internal combustion.

15. A device for converting a rectilinear movement into a rotary movement, said device comprising:

a crankshaft and one or more piston-cylinder mechanisms, each piston cylinder mechanism having a cylinder, a piston and a connecting rod connecting the piston to the crankshaft such that said piston is moveably arranged in the cylinder for rectilinear movement along an axis of movement to cause said crankshaft to effect said rotary movement, wherein the crankshaft has a center of rotation which is arranged displaced at a displacement distance from the axis of movement of the or each piston and that the crankshaft has a direction of rotation that is clockwise when looking at the device in the longitudinal direction of the crankshaft and with the device oriented so that the or each cylinder is located above the crankshaft and displacement of the center of rotation of the crankshaft is to the right of the axis of movement of the or each piston;

wherein a connecting rod length is the distance between the connection point of the connecting rod at the piston and the connection point of the connecting rod at the crankshaft;

wherein the connecting rod length is greater than zero and less than or equal to 1.5 multiplied by the length of the piston stroke; and wherein the crankshaft is displaced and the connecting rod length is selected to provide improved torque in an early portion of the cycle after top dead center for higher performance.

16. A device according to claim 15, wherein said connecting rod length is <1.45 multiplied by the length of the piston stroke.

17. A device according to claim 15, wherein said connecting rod length is <1.4 multiplied by the length of the piston stroke.

18. A device according to claim 15, wherein said connecting rod length is <1.3 multiplied by the length of the piston stroke.

19. A device according to claim 15, wherein said connecting rod length is <1.2 multiplied by the length of the piston stroke.

20. A device according to claim 15, wherein said connecting rod length is in the interval 1.45 multiplied by the length of the piston stroke to 1.5 multiplied by the length of the piston stroke.

21. A device according to claim 15, said connecting rod length is in the interval 1.4 multiplied by the length of the piston stroke to 1.45 multiplied by the length of the piston stroke.

22. A device according to claim 15, wherein said connecting rod length is in the interval 1.3 multiplied by the length of the piston stroke to 1.4 multiplied by the length of the piston stroke.

23. A device according to claim 15, wherein said connecting rod length is in the interval 1.2 multiplied by the length of the piston stroke to 1.3 multiplied by the length of the piston stroke.

24. A device according to claim 15, wherein said connecting rod length is greater than 1.1 multiplied by the length of the piston stroke.

25. A device for converting a rectilinear movement into a rotary movement, said device comprising a crankshaft and one or more piston-cylinder mechanisms, each piston cylinder mechanism having a cylinder, a piston and a connecting rod connecting the piston to the crankshaft such that said piston is moveably arranged in the cylinder for rectilinear movement along an axis of movement to cause said crankshaft to effect said rotary movement, wherein the crankshaft has a center of rotation which is arranged displaced at a displacement distance in a range from 0.01 to 0.2 multiplied by the length of the piston stroke from the axis of movement of the or each piston and that the crankshaft has a direction of rotation that is clockwise when looking at the device in the longitudinal direction of the crankshaft and with the device oriented so that the or each cylinder is located above the crankshaft and displacement of the center of rotation of the crankshaft is to the right of the axis of movement of the or each piston, wherein improved torque is provided in an early portion of the cycle after top dead center for higher performance.

26. A device for converting a rectilinear movement into a rotary movement, said device comprising a crankshaft and one or more piston-cylinder mechanisms, each piston cylinder mechanism having a cylinder, a piston and a connecting rod connecting the piston to the crankshaft such that said piston is moveably arranged in the cylinder for rectilinear movement along an axis of movement to cause said crankshaft to effect said rotary movement, wherein the crankshaft has a center of rotation which is arranged displaced at a displacement distance of greater than or equal to 0.24 multiplied by the length of the piston stroke from the axis of movement of the or each piston and that the crankshaft has a direction of rotation that is clockwise when looking at the device in the longitudinal direction of the crankshaft and with the device oriented so that the or each cylinder is located above the crankshaft and displacement of the center of rotation of the crankshaft is to the right of the axis of movement of the or each piston, wherein improved torque is provided in an early portion of the cycle after top dead center for higher performance.

* * * * *